Patented Oct. 7, 1952

2,613,204

UNITED STATES PATENT OFFICE 2,613,204

CRYSTALLINE COMPLEXES OF UREA AND CYCLIC OXYGEN CONTAINING COMPOUNDS

Lloyd C. Fetterly, Seattle, Wash., assignor to Shell Development Company, San Francisco, Calif., a corporation of Delaware No Drawing. Application January 9, 1948, Serial No. 1,477

7 Claims. (Cl. 260—96.5)

This invention is concerned with the formation of novel crystalline complexes. More particularly, it is directed to the formation of complexes between urea and certain heterocyclic oxygen-containing compounds.

The formation of crystalline complexes between urea and several types of organic materials has received recent attention. The organic substances which are known to form complexes with urea include aliphatic unbranched hydrocarbons and oxygen-containing aliphatic compounds as well as 2,6-lutidine. Little is known about the characteristics of the reaction. The reasons for and mechanism of complex formation is still largely a matter of speculation. Many other types of compounds have been contacted with urea under conditions identical with those employed when complexes of the above substances have been formed without any evidence of complex formation. For example, branched hydrocarbons and naphthenic hydrocarbons show no tendency to form complexes with urea. In the absence of any insight regarding the theoretical aspects of these phenomena no reason can be given why the latter materials are inert toward urea while the former readily crystallizes in complex condition therewith.

The fractionation of mixtures of organic compounds by the use of selective complex-forming agents is a convenient means for separating specific types of substances from their mixtures with other materials. The use of complex formation however has been limited as indicated above by the lack of a basic understanding of the complex-forming mechanism. It appears upon the basis of work already reported that urea will crystallize with certain configurational types of organic materials and that such types can only be ascertained by experiment. However, once the type has been set out by a suitable number of specific positive complex formations it is a matter of ready prediction to anticipate what other materials within that type can be made to form urea complexes.

It is an object of this invention to provide a new process for the fractionation of mixtures containing certain organic compounds. It is another object of this invention to provide novel crystalline complexes of urea with a particular type of organic materials. Other objects will become apparent during the following discussion.

Now, in accordance with this invention, it has been found that urea forms crystalline complexes with unsubstituted oxacyclohydrocarbons having only C, H and O atoms and containing from 5-6 atoms in the oxacyclohydrocarbon ring, and in which the only oxygen present forms a part of the oxacyclohydrocarbon ring. Again in accordance with this invention, the most readily formed complexes are those of urea with heterocyclic organic materials having a single ring of which oxygen is a member. Still in accordance with this invention, this discovery has been utilized for the fractionation of mixtures containing such compounds. Finally, this process may be utilized for the isolation and purification of heterocyclic organic materials containing an oxygenated ring member.

Briefly the process by which these complexes may be formed comprises contacting urea with the heterocyclic compound whereby crystalline complexes of a more or less stable character are formed. These complexes may be employed without further modification or may be decomposed with the recovery of urea and the heterocyclic compounds, all as more particularly described hereinafter.

The group of heterocyclic compounds most readily forming crystalline complexes with urea are those having a single ring with oxygen being one member of the ring. Typical members of this group are 1,3-dioxole, furan, 1,3,5-trioxane, 1,3-dioxin, 1,4-dioxin, 1,2-pyran, 1,4-dioxane, 1,3-dioxane and 1,2-dioxane.

Derivatives of the above preferred class of heterocyclic oxygen compounds which form crystalline complexes with urea include dioxindole, tetrahydrofuran, tetrahydropyran, etc.

Another group of heterocyclic oxygen-containing organic compounds readily forming crystalline complexes with urea are two-ring systems containing oxygen in one of the rings. Members of this second preferred class include 1-oxaspiro(2,3)hexane, 2-oxabicyclo(2,1,0)pentane, cyclohexeneoxide, cyclophenylene methylene oxide, 2,1,3-benzoxadithiole, 1,3,2-benzodioxathiole, 1,2-benzisoxazole, anthranil, benzoxazole, 1,3-benzodioxole, benzofuran, isobenzofuran, 1,4-benzodioxin, 1,2-benzopyran, 2,3-benzopyran.

A further class of 2-ring heterocyclics forming crystalline complexes with urea are those wherein oxygen atoms are present in both rings of the system. Suitable species of this category are furoxan, 3,4-oxidotetrahydrofuran, dioxa-4-speroheptane, furo(2,3,b)furan, naphthodioxane, 2,6-pyranopyran, etc.

Heterocyclic oxygen-containing organic ring systems having three or more rings and one or more oxygen atoms in at least one of the rings likewise form crystalline complexes with urea.

Typical members of these higher molecular weight materials which may be used are 4,6-epoxy-1,3-benzodioxole, p-benzodifuran, m-alpha-benzodifuran, dibenzo-p-dioxin, and 1,2-benzodiphenyleneoxide.

It will be understood that the complexes may be formed between urea and any of the above heterocyclic substances either when the latter is in a purified condition or when it is in admixture with other materials.

In carrying out the complex formation urea is contacted with the heterocyclic substances in a number of optional environments. Preferably urea is dissolved in an aqueous solvent and still more preferably the solution of urea is substantially saturated at all times during the reaction if maximum removal of the heterocyclic materials is desired. Other liquid solvents which may be used for urea during complex formation include the lower alcohols, liquid sulfur dioxide, acetic anhydride and the sulfolanes. These materials may be used either alone or in admixture with each other or with water.

The heterocyclic materials from which complexes are to be formed may be contacted with urea in either a finely divided solid state or as a liquid, gas, or solution. The physical state in which contact is effected will be determined by the nature of the material and by the type of equipment employed during complex formation. It is a preferred practice to contact urea with the heterocyclic material when the latter is in a relatively non-viscous system.

The use of diluents or solvents for the heterocyclic substances has a powerful influence on the course of complex formation. Particular solvents may be found by experiment to promote or inhibit the formation of certain complexes. Therefore, the solvent should be chosen with careful regard to the temperature and other conditions under which the complexes are to be formed, always keeping in mind the final product which is desired. Typical solvents which have been found exceptionally useful include especially methyl isobutyl ketone and alcohols having 4 to 7 carbon atoms, particularly those having secondary or tertiary configuration. When a solvent is employed it should be present in an amount at least about equal to that of the heterocyclic substances or to the mixture containing the latter.

It has been found advantageous to employ urea for the complex formation which has been activated so that complexes are readily formed. In its present stage of preliminary development, the details of activation are not fully understood. However, it has been definitely proved that the rate of complex formation is greatly increased by the use of urea which has been previously heated to a temperature of 70–100° C. in the presence of water or which has been employed previously in the formation of crystalline complexes and later regenerated therefrom. For example, if urea is recycled through a complex-forming system including a regenerating zone wherein the urea is recovered from its complex, the rate of complex formation may be increased as much as 500% upon the 4th cycle. This use of activated urea becomes of substantial importance if heterocyclic substances are being treated which are present in a highly diluted amount or which are of such a type that complexes are formed reluctantly.

Urea and the heterocyclic oxygen-containing materials may be contacted in a number of suitable systems and a continuous process is highly desirable for several unexpected reasons. It has been found that the crystalline complex formed in a continuous system may be as much as 5 times as long as similar crystals formed in a batch reaction. This crystal length promotes optimum filterability and favors a high purity of the product. Due to the lower surface area of such large crystals an increasingly smaller amount of the undesired fractions of the said material are occluded on the surface of continuously formed crystalline complexes. This promotes fluid reaction mixtures as compared with the more thixotropic batch reactions.

The contacting of urea and the heterocyclic oxygen-containing material may take place in a crystallizing tower similar to those used in the catalytic petroleum conversion processes. The temperature at which contacting is preferably effected is from about −10° C. to about 70° C. The control of the temperature of contacting is an important factor in the determination of the rate and extent of complex formation. Under ordinary circumstances the rate of complex formation is favored by the use of relatively lower temperatures. However, it has been found that each specific material has a maximum temperature above which complexes will not be formed. Further, it has been discovered that this maximum critical temperature is substantially different for each material. Hence, this observation may be utilized for the fractionation of mixtures of heterocyclic substances, since a temperature of contacting may be employed whereat certain materials can form crystalline complexes. Others which are present may be prevented from doing so due to the fact that temperature may be higher than their maximum critical temperature of complex formation.

The use of certain solubility modifiers such as liquid sulfur dioxide, phenol and the like favors the formation of complexes if aromatic substances are present. Aqueous alcoholic solvents for urea having a water-to-alcohol ratio of from 4:1 to 20:1 also permits optimum formation of the complexes. Water may be used as the sole solvent for urea in many cases. A special type of contacting which may be used when highly soluble materials are to be treated comprises the contacting of vaporized heterocyclic substances or their mixtures with urea, the latter being in a solid state or in solution as already discussed.

When the complex between urea and the heterocyclic materials is formed in the presence of other organic substances and in the presence of a urea solvent the system may contain three phases, namely, the crystalline complex, the remaining organic materials and the urea solvent phase. A particular problem in this process comprises the satisfactory separation of these phases from one another. A special problem comprises the separation of the crystalline complexes from the undesired portions of their mixtures. It has been found that by employing a continuous system the phases separate more cleanly than if a batch process is employed. The addition of modifying materials such as wetting agents also facilitates the separation of the phases and permits the crystalline complexes to sink into any aqueous phase which is present.

The phenomenon referred to hereinabove regarding maximum crystallization temperatures may be utilized at this point of the process for the fractionation of mixtures containing more than one material capable of forming crystalline complexes with urea. By conducting the crystallization in a series of temperature controlled steps, fractions of the materials may be successively crystallized in complex form especially if the temperature of each step is substantially lower than that preceding.

By maintaining a pH below about 9.5, and preferably below 8, complex formation may proceed at an accelerated rate. If the system becomes highly alkaline the reaction becomes sluggish and may even stop.

Modifications in the extent of crystallization and the character of the complex crystals may be made by recycling previously extracted material or complexes or by recycling or adding substantially inert materials. These additions are desirable if the mixture being treated is of such a constitution that optimum crystal formation does not occur or if filtration difficulties arise.

The isolation of the crystalline complexes from other components of the reaction mixture may be effected by convenient means such as settling, decantation, centrifuging and filtration. Products of maximum purity are obtained by the latter two methods. The complexes may then be used without further modification or may be suitably treated for the recovery of urea and the heterocyclic oxygenated ring compound.

The complexes formed by this process are crystalline in character, usually needle-like in shape. They decompose readily, as described hereinafter, usually below their melting points. They appear to depend upon some form of hydrogen bonding, but their exact constitution has not yet been determined.

The regeneration of urea and the heterocyclic substances from its complex may be readily effected by heating the latter either alone, in the presence of a solvent for the heterocyclic material, or in the presence of a solvent for urea. Other suitable means of regeneration comprise steam distillation or heating by means of a hot dry gas such as nitrogen.

The preferred means of regeneration comprises warming the complex in the presence of water or a dilute aqueous solution of urea whereby the complex is decomposed and the urea thus regenerated dissolved in the aqueous phase present. If the regenerated heterocyclic substance is insoluble in water it will form a separate phase from the aqueous solution and may be readily separated therefrom.

The following examples are illustrative of the operation of the present process:

Example I

Dioxane was contacted with a saturated aqueous solution of urea at a temperature of 25° C. A flocculant crystalline complex immediately formed which was isolated by filtration. The complex could be warmed to recover dioxane therefrom.

Example II

When a mixture of furan and benzene is contacted with an aqueous solution of urea crystalline complexes of furan and urea are formed which may be separated by filtration. The complex may be decomposed by heating in order to regenerate furan and the original urea.

Example III

If 1,2-benzodiphenylene oxide in admixture with iso-octane is contacted with an alcoholic solution of urea crystalline complexes are formed between urea and the oxide. These may be separated from iso-octane by centrifuging and may be decomposed to yield separately urea and the oxide.

I claim as my invention:

1. As a new composition of matter, a crystalline molecular complex of urea with an unsubstituted oxacyclohydrocarbon having only C, H and O atoms and containing from 5 to 6 atoms in the oxacyclohydrocarbon ring, and in which the only oxygen present forms a part of the oxacyclohydrocarbon ring.

2. As a new composition of matter, a crystalline molecular complex of urea with tetrahydrofuran.

3. As a new composition of matter, a crystalline molecular complex of urea with furan.

4. As a new composition of matter, a crystalline molecular complex of urea with an unsubstituted dioxane.

5. As a new composition of matter, a crystalline molecular complex of urea with 1,2-dioxane.

6. As a new composition of matter, a crystalline molecular complex of urea with 1,3-dioxane.

7. As a new composition of matter, a crystalline molecular complex of urea with an unsubstituted monocyclic oxacyclohydrocarbon having only C, H and O atoms and containing from 5-6 atoms in the oxacyclohydrocarbon ring and in which the only oxygen present forms a part of the oxacyclohydrocarbon ring.

LLOYD C. FETTERLY.

REFERENCES CITED

The following references are of record in the file of this patent:

UNITED STATES PATENTS

| Number | Name | Date |
|---|---|---|
| 1,830,859 | Schotte et al. | Nov. 10, 1931 |
| 2,090,620 | Bibb | Aug. 24, 1937 |
| 2,257,384 | Johnston | Sept. 30, 1941 |
| 2,267,737 | Ipatieff et al. | Dec. 30, 1941 |
| 2,300,134 | Priewe | Oct. 27, 1942 |
| 2,376,008 | Riethof | May 15, 1945 |
| 2,116,640 | Quehl | May 10, 1938 |

FOREIGN PATENTS

| Number | Country | Date |
|---|---|---|
| 6,771 | Great Britain | Jan. 23, 1902 |

OTHER REFERENCES

Biginelli, Ber. 24, p. 1317-19 (Apr.-June 1891).

Beilstein, vol. 17, p. 281.

"Reel No. 143 of Technical Oil Mission" brought into U. S. by Dr. L. L. Newman, Bureau of Mines, and deposited in Library of Congress, May 22, 1946.

Kawerau et al., Scientific Proc. Royal Dublin Society, v. 23, 1944, p. 171, 174.

Fearon et al., ibidum, p. 103 and 106.